United States Patent [19]

Higbee

[11] 3,968,289

[45] July 6, 1976

[54] POLY(ARYLENE SULFIDE) COATING COMPOSITIONS CONTAINING POLYOXYETHYLATED VEGETABLE OIL

[75] Inventor: David E. Higbee, Bartlesville, Okla.

[73] Assignee: Phillips Petroleum Company, Bartlesville, Okla.

[22] Filed: Nov. 22, 1974

[21] Appl. No.: 526,255

[52] U.S. Cl. .................................. 428/195; 260/79; 427/385; 428/411
[51] Int. Cl.² .......................................... C08F 28/04
[58] Field of Search .............. 260/79; 428/195, 411; 427/385

[56] References Cited
UNITED STATES PATENTS

| | | | |
|---|---|---|---|
| 2,496,582 | 2/1950 | Enyeart | 260/613 |
| 2,678,935 | 4/1954 | Sundberg et al. | 260/410.6 |
| 2,965,678 | 12/1960 | Sundberg et al. | 260/615 |
| 3,350,462 | 10/1967 | Leary et al. | 260/615 |
| 3,492,125 | 1/1970 | Ray | 426/523 |
| 3,514,321 | 5/1970 | Duncan | 528/254 |
| 3,622,376 | 11/1971 | Tleszen | 428/419 |
| 3,652,327 | 3/1972 | Hill et al. | 428/451 |
| 3,776,880 | 12/1973 | Blackwell | 260/37 |
| 3,799,454 | 3/1974 | Blackwell | 241/16 |
| 3,856,560 | 12/1974 | Blackwell | 427/385 |

OTHER PUBLICATIONS

GAF Corp. *Emulphor EL-620-Emulphor EL-719* GAF Chem. Corp.; New York, N.Y.

*Primary Examiner*—Cameron K. Weiffenbach

[57] ABSTRACT

A composition comprising at least one poly(arylene sulfide) resin and at least one polyoxyethylated vegetable oil is employed to coat a surface of a substrate. The coating can be heated to fuse and cure the resin.

20 Claims, No Drawings

POLY(ARYLENE SULFIDE) COATING COMPOSITIONS CONTAINING POLYOXYETHYLATED VEGETABLE OIL

This invention relates to an improved poly(arylene sulfide) coating composition, a method of coating a substrate with this composition, and the resulting coated article.

Arylene sulfide polymers are ideally suited for coatings of a wide variety of articles because of the high temperature stability of such polymers and their ability to withstand chemical attack. These polymers are particularly well suited for coating equipment such as pump impellers, agitator blades, valve parts and the interior of conduits which are used in handling corrosive fluids. These polymers also have great potential in the coating of various items of cookware such as baking pans, skillets, and the like, because food does not stick to the cured polymeric surface.

It has been found that the type of wetting agent or surfactant used in the poly(arylene sulfide) coating formulations has an important effect on the quality of the coating on metals, ceramics and other high temperature stable substrates. Many of the surfactants result in the coating surface being relatively rough and having a large number of pinholes and fish eyes. Although nonionic surfactants such as alkylphenoxypoly(ethoxy) alcohols have been employed in commercially utilized poly(arylene sulfide) coating compositions with generally satisfactory results, the resulting coatings have a surface which is undesirably rough for many applications.

It has now been discovered that the use of a polyoxyethylated vegetable oil in the poly(arylene sulfide) coating composition provides a surprising superior coating surface, substantially free from blemishes, pinholes, fish eyes and other surface irregularities.

Accordingly, it is an object of the invention to provide a new and improved poly(arylene sulfide) coating composition. Another object of the invention is to provide a poly(arylene sulfide) coating having an improved surface finish. Another object of the invention is to reduce the surface irregularities in a poly(arylene sulfide) coating. Other objects, aspects and advantages of the invention will be apparent from a study of the specification, the drawing and the appended claims to the invention.

The term "poly(arylene sulfide)" as used in this specification is intended to include polymers of the type which are prepared as described in U.S. Pat. No. 3,354,129, issued Nov. 21, 1967, to Edmonds and Hill. As disclosed in that patent, these polymers can be prepared by reacting a polyhalosubstituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in the coating procedure of this invention, because of their high thermal stability and availability of the materials from which they are prepared, are those polymers having the repeating unit —R—S— where R is phenylene, biphenylene, naphthalene, biphenylene ether or a lower alkyl-substituted derivative thereof. By "lower alkyl" is meant alkyl groups 1 to 6 carbon atoms such as methyl, propyl, isobutyl, n-hexyl, and the like. The preparation of such polymers is disclosed in the above patent of Edmonds et al.

The polymers which are used for coatings in this invention are preferably those which have melting temperatures above about 200°C. These arylene sulfide polymers can have a melting temperature anywhere in the range from 200°C to 425°C. Polymers of phenylene sulfide normally have melting temperatures in the range from about 280°C to 375°C. The preferred polymers have an inherent viscosity in chloronaphthalene at 206°C of at least 0.1, more preferably between 0.1 and 0.3, and ideally between 0.13 and 0.23, as such polymers have been found to form very adherent, uniform coatings which are superior for the uses mentioned above.

The nonionic surfactant which is employed in the poly(arylene sulfide) coating composition in accordance with the present invention is at least one polyoxyethylated vegetable oil. Specifically polyoxyethylated castor oil, polyoxyethylated saffron flower oil, polyoxyethylated peanut oil, polyoxyethylated corn oil, polyoxyethylated cottonseed oil, polyoxyethylated soya bean oil, and the like, and mixture thereof are considered to be suitable. In general it is considered desirable for the polyoxyethylated vegetable oil to have an average number of oxyethylene groups per molecule in the range of 6 to 30, and preferably in the range of 8 to 20. Presently preferred are polyoxyethylated derivatives of castor oil having a viscosity at 25°C in the range of 500 to 1000 cps, a specific gravity in the range of 1.04 to 1.07, and a flash point in the range of 275° to 295°C.

The polyoxyethylated vegetable oil will generally be employed in an amount in the range of 0.01 to 10 weight percent, preferably in an amount in the range of 0.1 to 5 weight percent, based on the weight of poly(arylene sulfide) resin employed in the coating composition. The polyoxyethylated vegetable oil can be admixed with the poly(arylene sulfide) resin in any suitable manner, preferably by mixing finely divided particles of the resin with the liquid polyoxyethylated vegetable oil in the presence of a diluent. The slurry can be prepared in any suitable manner; for example, by blending the ingredients in a suitable mixing device such as an intensive blender or a ball mill, at room temperature for a period in the range of 30 minutes to 24 hours.

Any liquid can be used as the diluent provided the liquid is inert to the other components of the slurry and to the substrate, and provided it is readily volatilized prior to or during the subsequent heating or curing step. The diluents presently preferred are water and ethylene glycol. Other diluents which can be used include alcohols such as methyl alcohol, ethyl alcohol, and isopropyl alcohol, and hydrocarbons such as benzene, toluene, heptane, cyclohexane, and various hydrocarbon mixtures such as kerosene, diesel fuel, and the like. Less preferred diluents which can be used include chlorinated biphenyl, dimethyl phthalate, and the like. Mixtures of the diluents can be used.

Although the slurry can be applied to the substrate without prior heat treatment of the substrate, preferably the substrate is heated to a temperature of at least 200°C, more preferably about 300°C to 425°C, prior to application of the coating. Most desirably, the slurry is applied to the substrate maintained at a temperature high enough to fuse the polymer on contact.

The particle size of the polymer can vary considerably and the most desirable particle size for a particular application can be easily determined in a relatively few trials. This can vary from the finest powders available up to about 10,000 microns in particle size. Good results can be obtained with the polymer in a particle size of about 3 to 30 microns, although the invention can be satisfactorily practiced with polymers of particle size outside this range.

The concentration of the polymer in the carrier liquid depends upon the coating application of whether or not additional solids are employed. As a practical matter, the slurry should not be so dilute that the polymer particles are not closely enough associated on deposit on the surface to permit them to fuse together on melting. On the other hand, the thickness of the slurry and its ease of application will impose a practical upper limit on the solids concentration. Generally a solids content of about 10 to about 60 weight percent can be used and best results are obtained with a slurry that contains about 25 to about 40 weight percent solids based on the weight of the total slurry. In addition to the poly(arylene sulfide) and surfactant, other materials can be incorporated into the slurry, such as fillers, pigments and similar coloring agents, and the like. Suitable fillers include polytetrafluoroethylene, carbon black, bentonite, titanium dioxide, iron oxide, molybdenum disulfide, and the like, and mixtures thereof.

Any surface that can be heated to the coating temperature necessary to fuse the polymer can be coated with the procedure of this invention. In general, the articles which are coated are those in which the surface are formed of thermally stable polymeric materials or substances such as metal, glass, ceramic or stone. Preferably, metals such as aluminum, iron, iron alloys, steel, titanium, chromium, and the like are used. Preparation of the surface to be coated need only include a suitable cleaning to remove the scale, dirt and grease.

After the coating has been applied and the polymer fused, it is desirable to cure the coating by continued heating at an elevated temperature, preferably in the range of about 260°C to 375°C, in an oxygen-containing atmosphere, such as air, for about 5 minutes to 6 hours or more, preferably about 370°C for 30 minutes to 1 hour. The thickness of the coating can be increased by additional applications following the same procedure after each curing period. Coatings thicknesses of about 0.0125 to 1.25 mm can easily be applied. Coatings having thicknesses of about 0.025 to 0.75 mm are satisfactory for most uses. The slurry can be applied by any procedure such as by spraying the slurry onto the heated surface or flowing the slurry over the hot article, preferably while providing for escape of the vaporized solvent.

The following examples are presented in further illustration of the invention, but should not be unduly construed as limitations thereof.

EXAMPLE I

Slurries were prepared by ball milling overnight 40 parts by weight of uncrosslinked poly(phenylene sulfide) and 60 parts by weight of water. The uncrosslinked poly(phenylene sulfide) had an inherent viscosity of 0.16 ml/g in chloronaphthalene at 206°C, and a melt flow of greater than 3000 g/10 minutes (ASTM D 1238-70, using 5 Kg weight at 280°C). Aliquot 200 ml samples were placed in a Waring blender and 2 wt. %, based on the weight of the slurry, of a surfactant to be tested was added and mixed for 60 seconds at high speed. Cleaned and "degreased" 7.65 × 15.3 cm coupons of aluminum were spray coated to a thickness of 0.05 mm to determine the effectiveness of each wetting agent. The coated coupons were cured at 371°C for 30 minutes. A visual examination, an examination at 20X enlargement and an examination for pinholes by means of a Tesla coil were made. The results are summarized below using the following criteria: an alkylphenoxypoly(ethoxy)ethanol commercially available under the trademark Triton X-100 was rated "good" and was used as the standard. A decrease in number of fish eyes, pinhole and other surface defects of 20 to 75%, with respect to the standard, was rated "very good"; a decrease of over 75% in the number of defects was rated "excellent"; an increase of 20 to 40% in the number of defects was rated "fair"; and an increase of over 40% in the number of defects from that of the standard was rated "poor".

TABLE I

| Run | Surfactant Used | Rating |
|---|---|---|
| 1 | Octylphenoxypolyethoxyethanol[a] | Good |
| 2 | Octylphenoxypolyethoxyethanol[b] | Fair |
| 3 | Nonylphenoxypolyethoxyethanol[c] | Good |
| 4 | Alkylphenoxypolyethoxyethanol[d] | Good |
| 5 | Alkylphenoxypolyethoxyethahol[e] | Poor |
| 6 | Polyoxyethylated fatty alcohol[f] | Fair |
| 7 | Polyoxyethylated castor oil[g] | Excellent |
| 8 | Polyoxyethylated castor oil[h] | Excellent |

[a]Triton X-100 (Rohm & Haas)
[b]Igepal CA-630 (GAF Corp.)
[c]Polytergent B-300 Olin-Mathieson
[d]Igepal DM-710 (GAF Corp.)
[e]Igepal CTA-639 (GAF Corp.)
[f]Emulphor ON-877 (GAF Corp.)
[g]Emulphor EL-620 (GAF Corp.)
[h]Emulphor EL-719 (GAF Corp.)

All of the above surfactants are of the nonionic type. The data show that the polyoxyethylated castor oils were substantially better than any of the other surfactants.

EXAMPLE II

Slurries were prepared as in Example I using various fillers in the formulation with polyoxyethylated castor oils to check if the improvement was retained when each filler was used. The coupons were spray coated and cured as in Example I.

In the first run, 950 g. of poly(phenylene sulfide) and 234 g. of $TiO_2$ were admixed with 2100 ml of water to which was added 32 g. of Emulphor 620 polyoxyethylated castor oil.

In the second run, the coating formulation was prepared by admixing 800 g. of poly(phenylene sulfide), 16 g. of carbon black, 12 g. of Bentonite, 1200 ml of water, 1200 ml of ethylene glycol, and 24 g. of Emulphor 620 polyoxyethylated castor oil.

In the third run, the coating formulation was prepared by admixing 884 g. of poly(phenylene sulfide), 884 g. of $MoS_2$ 2650 ml of water, and 26 g. of Emulphor 620 polyoxyethylated castor oil.

In the fourth run, the coating formulation was prepared by admixing 950 g. of poly(phenylene sulfide), 50 g. of carbon black, 190 g. of Teflon (TL-126) polytetrafluoroethylene, 1850 ml of water, 975 ml of glycol, and 32 g. of Emulphor 620 polyoxyethylated castor oil.

All of the test coupons in these runs were rated excellent.

It can be seen that a large variety of coating formulations can be made using a polyoxyethylated vegetable oil as the surfactant.

Reasonable variations and modifications are possible within the scope of the foregoing disclosure, the drawing and the appended claims to the invention.

That which is claimed is:

1. A composition comprising at least one poly(arylene sulfide) resin and at least one polyoxyethylated vegetable oil.

2. A composition in accordance with claim 1 wherein said polyoxyethylated vegetable oil is polyoxyethylated castor oil.

3. A composition in accordance with claim 1 wherein said polyoxyethylated vegetable oil is present in an amount in the range of about 0.01 to about 10 weight percent, based on the weight of said resin.

4. A composition in accordance with claim 3 wherein said polyoxyethylated vegetable oil is polyoxyethylated castor oil.

5. A composition in accordance with claim 4 wherein said polyoxyethylated castor oil is present in an amount in the range of about 0.1 to about 7 weight percent, based on the weight of said resin.

6. A composition in accordance with claim 5 wherein said resin is in particulate form, and further comprising a sufficient amount of a suitable diluent to form a dispersion of the particles of said resin in said diluent.

7. A composition in accordance with claim 6 wherein said diluent is water.

8. A composition in accordance with claim 7 wherein said poly(arylene sulfide) resin is poly(phenylene sulfide).

9. A composition in accordance with claim 1 wherein said resin is in particulate form, and further comprising a sufficient amount of a suitable diluent to form a dispersion of the particles of said resin in said diluent.

10. A process of coating a substrate which comprises applying to a surface of said substrate a layer of the dispersion of claim 9, and then heating the thus applied layer in the presence of oxygen to a suitable temperature for a sufficient time to fuse and cure said poly(arylene sulfide) resin.

11. A process in accordance with claim 10 wherein said polyoxyethylated vegetable oil is present in said dispersion in an amount in the range of about 0.01 to about 10 weight percent, based on the weight of said resin in said dispersion.

12. A process in accordance with claim 11 wherein said polyoxyethylated vegetable oil is polyoxyethylated castor oil.

13. A process in accordance with claim 12 wherein said polyoxyethylated castor oil is present in said dispersion in an amount in the range of about 0.1 to about 7 weight percent, based on the weight of said resin in said dispersion.

14. A process in accordance with claim 13 wherein said diluent is water.

15. A process in accordance with claim 14 wherein said poly)arylene sulfide) resin is poly(phenylene sulfide).

16. An article of manufacture comprising a substrate having at least a portion of a surface of said substrate coated in accordance with the process of claim 10.

17. An article in accordance with claim 16 wherein said polyoxyethylated vegetable oil is present in the coating in an amount in the range of about 0.01 to about 10 weight percent, based on the weight of said resin in said coating.

18. An article in accordance with claim 17 wherein said polyoxyethylated vegetable oil is polyoxyethylated castor oil.

19. An article in accordance with claim 18 wherein said polyoxyethylated vegetable oil is present in the coating in an amount in the range of about 0.1 to about 7 weight percent, based on the weight of said resin in said coating.

20. An article in accordance with claim 19 wherein said poly(arylene sulfide) resin is poly(phenylene sulfide).

* * * * *